United States Patent [19]
Hayakawa

[11] Patent Number: 6,139,717
[45] Date of Patent: Oct. 31, 2000

[54] PROCESS FOR TREATING WATER AND APPARATUS THEREFOR

[76] Inventor: Hideo Hayakawa, 2656-12, Moriya-ko, Moriya-machi, Kita-soma-gun, Ibaraki-ken 302-0128, Japan

[21] Appl. No.: 09/287,096

[22] Filed: Apr. 7, 1999

[30] Foreign Application Priority Data

Apr. 24, 1998 [JP] Japan ................................ 10-115022

[51] Int. Cl.[7] .................................................. C02F 1/461
[52] U.S. Cl. ..................... 205/744; 204/229.5; 204/229.7
[58] Field of Search ..................................... 205/742, 744; 204/229.5, 229.7

[56] References Cited

U.S. PATENT DOCUMENTS

| 5,376,242 | 12/1994 | Hayakawa | 205/744 |
| 5,435,894 | 7/1995 | Hayakawa | 204/229.5 |
| 5,478,449 | 12/1995 | Hayakawa | 205/744 |

Primary Examiner—Arun S. Phasge
Attorney, Agent, or Firm—Arent Fox Kitner Plotkin & Kahn, PLLC

[57] ABSTRACT

The invention provides a process and apparatus for treating water, which can be stably operated with high efficiency over a long period of time. The apparatus has a grounding electrode and a pair of applying electrodes connected to a DC voltage source through a register and first and second high-frequency switches which are controlled by a high-frequency switching commander circuit, to convert DC voltage from the DC voltage source to AC voltage to be fed to the applying electrodes. The high-frequency switching commander circuit is connected to a first high-frequency oscillation circuit connected to a control circuit which is controlled by a second high-frequency oscillation circuit, to provide a signal changing randomly in frequency as output signal from the first high-frequency oscillation circuit. The second high-frequency oscillation circuit also controls a flip-flop circuit connected to the first high-frequency oscillation circuit, to add acutely and momentary frequency fluctuating portions in randomly frequency changing signal from the first oscillation circuit.

4 Claims, 3 Drawing Sheets

PROCESS FOR TREATING WATER AND APPARATUS THEREFOR

BACKGROUND OF THE INVENTION

1. Field of the Invention

The present invention relates to a process for treating water in a lake, marsh or river, industrial waste water, processing water, drinking water or deionized water, by giving electrical energy thereto and an apparatus therefor.

2. Related Arts

Such a process and apparatus for treating water have been known as disclosed in U.S. Pat. Nos. 5,435,894 and 5,376,242 in the name of the present inventor. According to the process disclosed in the patent literatures, the quality of water is improved by applying high-frequency AC voltage to a pair of applying electrodes immersed in the water to decrease oxidation-reduction potential (ORP) thereof, so as to accelerate cohesion-precipitation or flotation of organic materials causing pollution of the water.

However, such a process and apparatus have a disadvantage in that scale forms in relatively short period of time on surface of the applying and grounding electrodes to cause reduction of electric current value through the electrodes, so that treating efficiency decreases.

SUMMARY OF THE INVENTION

Therefore, an object of the invention is to provide a process for stable treating water over a long period of time to improve quality thereof.

According to the invention, the object can be attained by a process for treating water by arranging therein a pair of applying electrodes, arranging a grounding electrode near the applying electrodes, and applying AC voltage to the applying electrodes to decrease ORP of the water, wherein a frequency of AC to be fed to the applying electrodes is controlled to generate randomly changing frequency including acute and momentary fluctuating portions therein.

According to the process of the invention, almost no scale is formed on surface of the applying electrodes over a long period of time, so that water can be stably treated with good efficiency, without troublesome maintenance operation.

Two grounding electrodes may be arranged, so that one of them is grounded and the other is simultaneously connected to plus side and vice versa, with relatively low periodicity, cohesion of foreign material on surface of the grounding electrodes can be prevented to provide more stable treatment of the water.

An amount of dissolved oxygen and ORP value of the water treated by the process according to the invention is very low. If deionized water is treated by the process, therefore, water suitable as a coolant for nuclear reactors to prevent generation of rust in piping can be obtained.

Another object of the invention is to provide an apparatus for carrying out the process.

According to the invention, this object can be attained by an apparatus comprising a pair of applying electrodes, a grounding electrode arranged near the applying electrodes, a DC voltage source, a first and second high-frequency switches respectively connected to the DC voltage source through a variable resistor, a high-frequency switching commander circuit of a flip-flop circuit connected to the high-frequency switches through a resistor, a first high-frequency oscillation circuit connected to the high-frequency switching commander circuit, a control circuit connected to the first high-frequency oscillation circuit and having a random voltage signal generator, to provide by the first high-frequency oscillation circuit a signal randomly changing in frequency, and a flip-flop circuit connected between the first high-frequency oscillation circuit and a second high-frequency oscillation circuit, to add acutely and momentary fluctuating portions in the randomly frequency changing signal from the first high-frequency oscillation circuit, whereby the high-frequency switching commander circuit gives a switching signal from said first high-frequency oscillation circuit to the first and second high-frequency switches to convert the DC voltage from said DC voltage source to high-frequency AC voltage which is fed to said applying electrodes to decrease ORP of water to be treated.

In case of treating water in a lake, marsh or river, industrial waste water, processing water, drinking water or deionized water by using such an apparatus, the pair of applying electrodes is arranged in the water to apply AC voltage thereto, whereby an amount of dissolved oxygen and ORP of the water decreases in a short period of time and organic materials in the water are decomposed and almost all of them shall be gasified and a part thereof is cohered and precipitated to make clean the water or the quality of water is improved, since almost no scale is formed on surface of the applying electrodes and thus treating capacity of the apparatus does not decrease, even if the treating period of time becomes longer.

The applying electrode is made of a metal having higher electrolytic property such as zinc, magnesium alloy, copper, iron or stainless steel, or metal oxide such as lithium oxide, or stable metal such as titanium, platinum or the like.

DESCRIPTION OF THE PREFERRED EMBODIMENTS

A process and apparatus according to the invention will now be further explained in more detail with reference to the drawings and by a Test Example.

Figure 1:
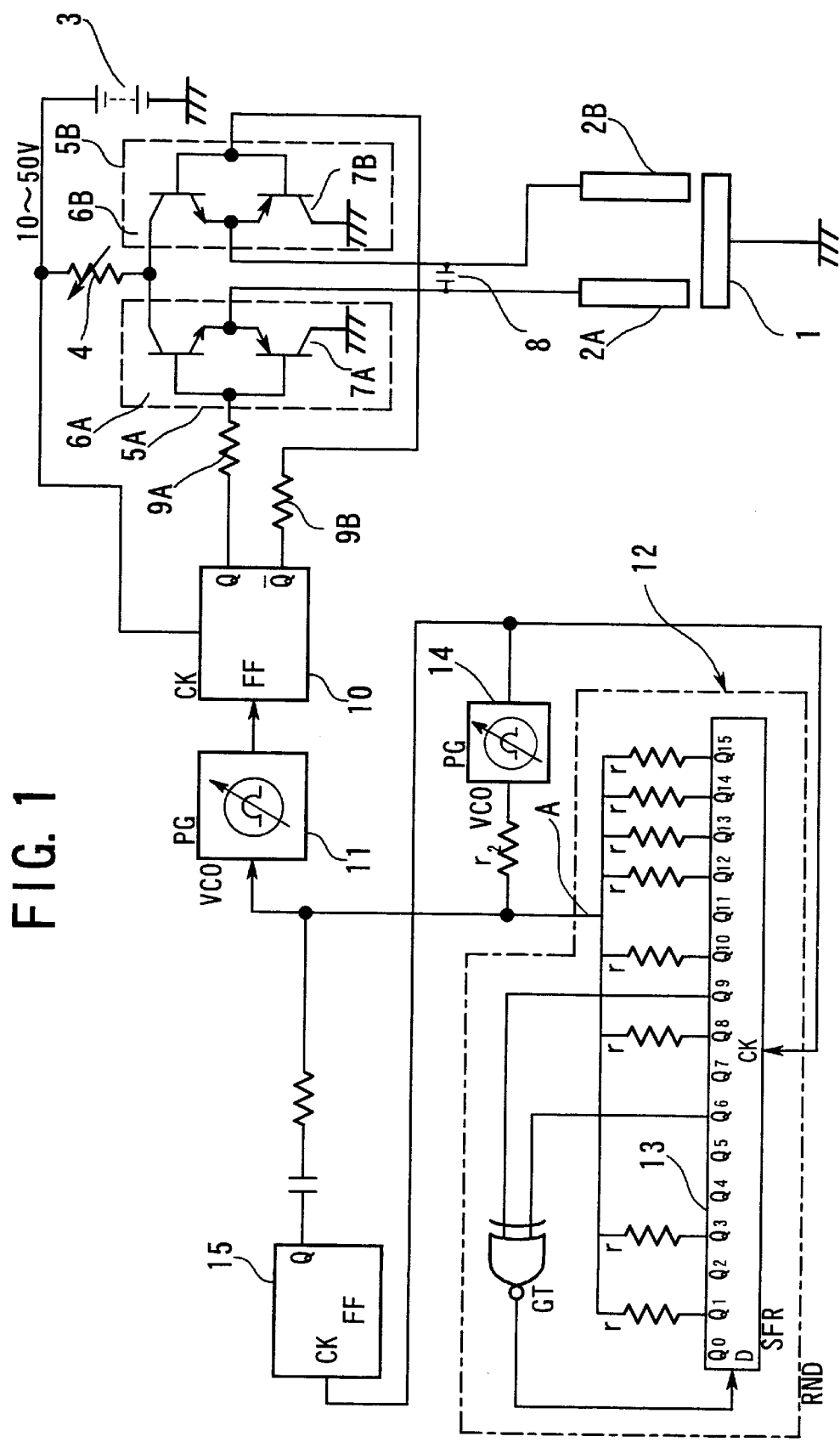
FIG. 1 is a circuit diagram for a first embodiment of apparatus for treating water according to a process of the invention.

FIG. 1 is a circuit diagram of the apparatus according to the invention, which has a grounding electrode 1 and a pair of applying electrodes 2A and 2B arranged near the grounding electrode, the electrodes being immersed in water to be treated. In this embodiment, a stainless-steel plate is selected for the grounding electrode 1 and zinc plates are selected for applying electrodes 2A and 2B, respectively, but other materials such as lithium oxide, magnesium alloy, copper, titanium, iron, platinum, platinum plated metal or the like can be selected for the applying electrodes based on quality of the water to be treated, usage of the treated water and other various factors.

Between the applying electrodes 2A and 2B and a DC voltage source 3, a first and second high-frequency switches 5A and 5B are connected through a variable resistor 4, to convert DC from the DC voltage source to AC which is given to the applying electrodes. The first and second high-frequency switches 5A and 5B are formed by transistors 6A, 7A and 6B, 7B, respectively. The applying electrodes 2A and 2B are connected through a capacitor 8. Voltage from the DC voltage source can be adjusted by the variable resistor 4 in a range of 10–50V, in response to quality of the water to be treated.

To the first and second high-frequency switches 5A and 5B, a high-frequency switching commander circuit 10 of a flip-flop circuit is connected through resistors 9A and 9B, respectively, to give high-frequency switching command to the high-frequency switches. A first high-frequency oscillation circuit 11 including a voltage controlled oscillator (VCO) and a pulse generator (PG) is connected to the high-frequency switching commander circuit 10 and a control circuit 12 of a random voltage generator (RND), which outputs a signal to control the voltage controlled oscillator (VCO) in the first high-frequency oscillation circuit 11.

The first high-frequency oscillation circuit 11 is of a variable frequency type, and oscillation frequency thereof varies with the voltage of the control signal applied to its terminal from the control circuit 12. For instance, the oscillation frequency varies over about 3–5 KHz above and below a predetermined center frequency of about 30 KHz.

The control circuit 12 includes a shift register (SFR) 13 and a gate signal generator (GT). The shift register 13 is of 16 stages and can be read accumulated and registered information through terminals $Q_0$–$Q_{15}$ in parallel manner. Shifting operation of the shift register is controlled by shift pulses supplied from a second high-frequency oscillation circuit 14 including a voltage controlled oscillator (VCO) and a pulse generator (PG).

The gate signal generator GT is an exclusive OR circuit and outputs the binary "1" signal if same signals arrive at its both input terminals, and outputs the binary "0" signal if different signals arrive at its both input terminals, and thus it operates as coincidence detection circuit. One of the input terminals of the gate signal generator GT is connected to an even-number stage of the shift register (SFR) 13, for instance to the terminal $Q_6$ of the 6th stage, whereas the other input terminal is connected to an odd-number stage of the shift register (SFR) 13, for instance to the terminal $Q_9$ of the 9th stage. An output signal from the gate signal generator (GT) is fed to the lowest stage $Q_0$ of the shift register (SFR) through its input terminal (D). Then, corresponding information is sequentially shifted to higher rank stages to store in the shift register (SFR) 13 as random number information.

Pieces of so stored random number information will be selectively picked up through resistors "r" and will be summed. In this embodiment, terminals $Q_1$, $Q_3$, $Q_8$, $Q_{10}$, $Q_{12}$–$Q_{15}$ of the 1st, 3rd, 8th, 10th and 12th–15th stages are connected to a common joint "A". The common joint "A" is connected to the voltage controlled oscillator (VCO) of the first high-frequency oscillation circuit 11. When a pattern in random number information stored in each stage varies, therefore, different voltage value appears at the joint "A" and thus output signal from the first high-frequency oscillation circuit 11 randomly changes in frequency.

While, an input terminal of the high-frequency oscillation circuit 11 is also connected to a flip-flop circuit (FF) 15 which shifts from one of two stable states to another stable state and vice versa by trigger pulses from the pulse generator (PG) in the second high-frequency oscillation circuit 14.

The pulse generator (PG) in the second high-frequency oscillation circuit 14 outputs a continuous pulse having a center frequency of, for instance, 5 Hz, repeating periodicity of which pulse changes depending on voltage of the signal to be inputted to the voltage controlled oscillator (VCO) in the second high-frequency circuit 14. The range of frequency fluctuation is several Hz above and below of the center frequency. The voltage appearing at the joint A is given to the voltage controlled oscillator (VCO) through a resistor $r_2$ and thus the pulse repeating periodicity of the voltage controlled oscillator changes by the random signal due to the shift register (SFR) which uses as its shift pulse the output of the pulse generator (PG) in the second high-frequency circuit 14.

Therefore, a control signal to be outputted to the pulse generator (PG) in the first high-frequency oscillation circuit 11 randomly changes in voltage and frequency fluctuation periodicity by the control circuit 12 and forms an acute and momentary frequency fluctuating portion ("I" in FIG. 2) due to each shifting operation of the flip-flop circuit 15.

According to the invention, the first high-frequency oscillation circuit 11 does not generate same output signal pattern with a short interval, since the signal for mainly controlling the same has been formed by utilizing the random-number information pattern stored in about half stages of the shift register (SFR) 13 in the control circuit 12, the coincidence detection result selected from each one of even-number and odd-number stages has been used as the input information for the shift register, there is an inclination in the selected stages, and the signal from the flip-flop circuit (FF) 15 is added in addition to the signal from the control circuit 12.

Figure 2:
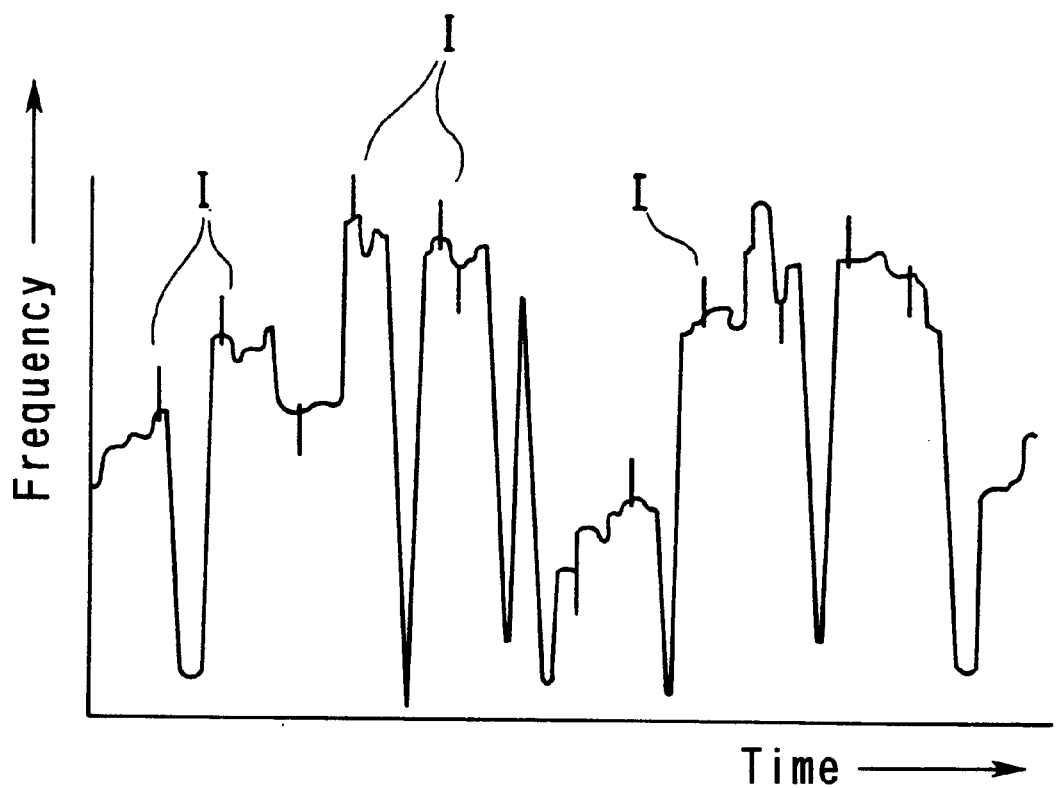
FIG. 2 is a graph showing frequency fluctuation in the apparatus.

When a switch of the DC voltage source 3 is turned ON, the control circuit 12 and flip-flop circuit (FF) 15 are operated as referred to for feeding the control signals to the first high-frequency oscillation circuit 11, and the voltage controlled oscillator (VCO) therein issues the output signal, the frequency of which randomly changes and has acute and momentary frequency fluctuating portions ("I" in FIG. 2). The output signal of the first high-frequency oscillation circuit 11 is fed to the high-frequency switching commander circuit 10 which gives the switching command alternatively to the first and second high-frequency switches 5A and 5B to feed AC voltage having the frequency fluctuation as shown in FIG. 2 to the pair of applying electrodes 2A and 2B to treat water, in which the applying electrodes and the grounding electrode 1 are immersed.

Figure 3:
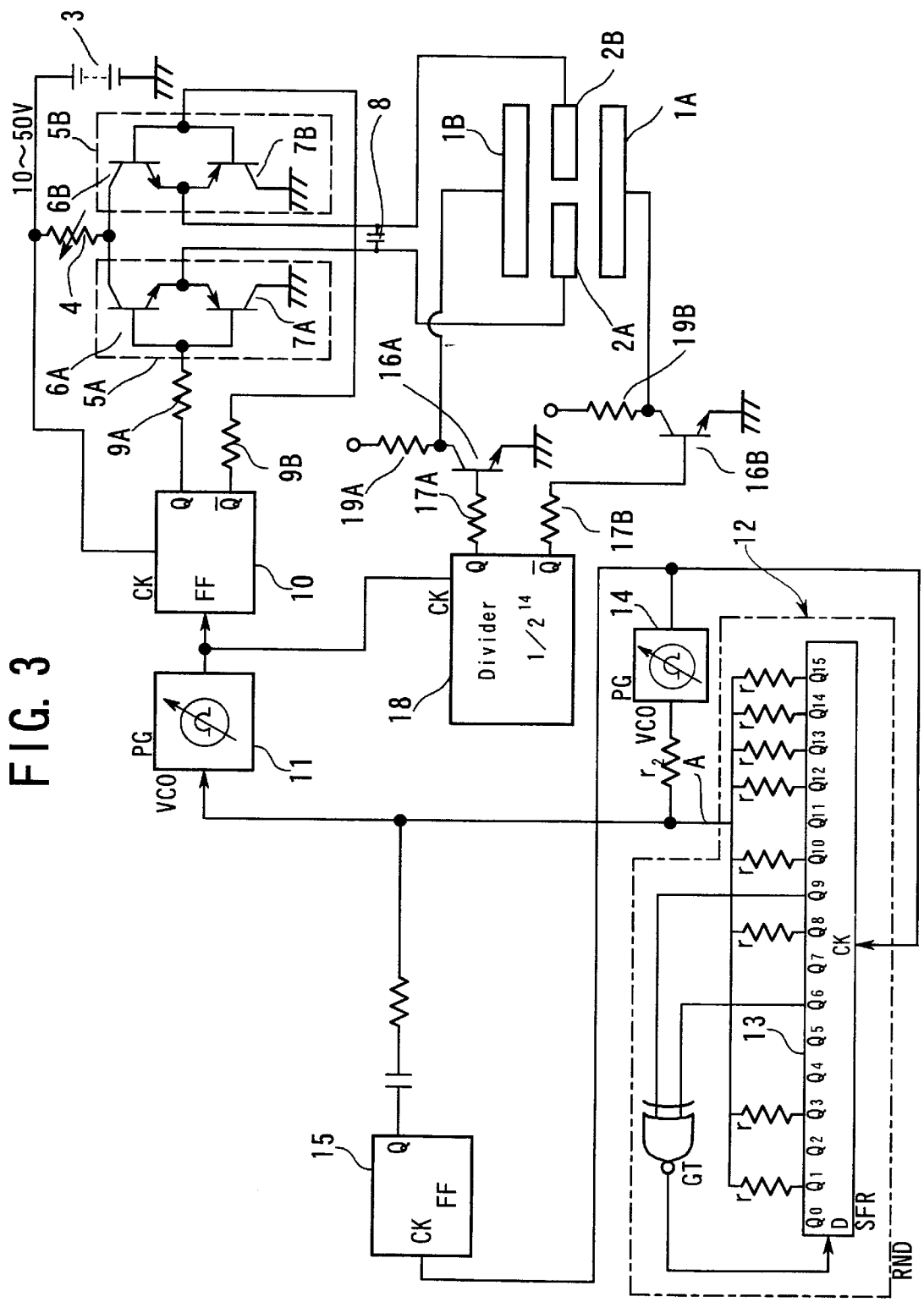
FIG. 3 is another circuit diagram for a second embodiment of the apparatus.

In FIG. 3, there is shown a second embodiment of the apparatus according to the invention, which is different from the first embodiment shown in FIG. 1 only in that two grounding electrodes 1A and 1B as well as a circuit for alternatively grounding the electrodes with a relative low periodicity are added. Each of the grounding electrodes 1A and 1B is made of stainless-steel, titanium or titanium plated plate. The grounding electrodes are connected to switches 16A or 16B including a transistor, respectively, which are in turn connected to a low-frequency switching commander circuit 18 through resistors 17A and 17B, respectively, which circuit is connected to the high-frequency oscillation circuit 11 to divide a high-frequency signal of, for instance, 60 KHz from the high-frequency oscillation circuit by $\frac{1}{2}^{14}$ and to give such a low-frequency switching command to the switches 16A and 16B.

When a resistor 19A connected to the switch 16A is grounded, another register 19B connected to the switch 16B maintains the grounding electrode 1B in positive potential by connecting a collector thereof to plus side.

The switches 16A and 16B are alternatively turned ON to alternatively ground the grounding electrodes 1A and 1B. The electrode 1B in OFF state is kept in positive potential through the resistor 17B.

As constructed to the above, cohesion of foreign material on surface of the grounding electrodes can be prevented to increase water treating efficiency and make possible a stable water treating operation over relatively long period of time.

Test Example

A comparative test was carried out by using the apparatus as shown in FIG. 1 and a prior apparatus as disclosed in U.S. Pat. No. 5,435,894 on city water and by setting the DC voltage source at 40V. It has been confirmed by eyesight that an amount of materials adhered on surface of the applying electrodes of the apparatus according to the invention is remarkably small than that of the prior art apparatus. During the test, change of current value at the applying electrodes was measured with time intervals to obtain results shown in following Table 1. As apparently seen from the Table, the electrode current value according to the prior art process gradually decrease, as the time lapses and the value become in half, after lapsed 100 hours, but according to the process of the invention, decrease is only less than about 7% after lapsed 100 hours to confirm a fact that the process according to the invention makes possible stable water treatment over a long period of time, which coincide with the result of eyesight observation on the applying electrodes. Reason of causing such phenomena has not been elucidated, but the inventor thinks that the high-frequency AC voltage alternatively supplied to the applying electrodes is very random and includes acute and momentary fluctuating portions thereon, which causes a certain electric field interference, since swells can be recognized on surface of the water and such a phenomenon has not been observed in the case of the prior art apparatus.

TABLE 1

| Apparatus (frequency) | Initial value | After 24 hours | After 48 hours | After 100 hours |
|---|---|---|---|---|
| Prior art (30 KHz) | 3A | 2.5A | 2A | 1.5A |
| Invention 30 ± 3 KHz | 3A | 3A | 2.9A | 2.8A |

What is claimed is:

1. In a process for treating water comprising the steps of providing a pair of applying electrodes made of a metal having higher electrolytic property and a grounding electrode arranged near the applying electrodes, in water to be treated, and applying AC voltage to the applying electrodes to decrease ORP of the water, the improvement where frequency of AC to be fed to the applying electrodes is controlled to generate randomly changing frequency including acute and momentary fluctuating portions therein.

2. The process as claimed in claim 1, wherein a pair of grounding electrodes is arranged to be alternatively grounded with a low periodicity.

3. In a process for treating water comprising the steps of providing a pair of applying electrodes made of a stable metal having substantially no electrolytic property and a grounding electrode arranged near the applying electrodes, in water to be treated, and applying AC voltage to said applying electrodes to decrease ORP of the water, the improvement where frequency of AC to be fed to the applying electrodes is controlled to generate randomly changing frequency including acute and momentary fluctuating portions therein.

4. An apparatus for treating water comprising a pair of applying electrodes, a grounding electrode arranged near the applying electrodes, a DC voltage source, a first and second high-frequency switches respectively connected to said DC voltage source through a variable resistor, a high-frequency switching commander circuit of a flip-flop circuit connected to said high-frequency switches through a resistor, a first high-frequency oscillation circuit connected to said high-frequency switching commander circuit, a control circuit connected to said first high-frequency oscillation circuit and having a random voltage signal generator, to provide by said first high-frequency oscillation circuit a signal randomly changing in frequency, and a flip-flop circuit connected between said first high-frequency oscillation circuit and a second high-frequency oscillation circuit, to add acutely and momentary fluctuating portions in the randomly frequency changing signal from said first high-frequency oscillation circuit, whereby said high-frequency switching commander circuit gives a switching signal from said first high-frequency oscillation circuit to said first and second high-frequency switches to convert the DC voltage from said DC voltage source to high-frequency AC voltage which is fed to said applying electrodes to decrease ORP of water to be treated.

\* \* \* \* \*